INVENTOR.
Arthur R. Woolfolk

Feb. 12, 1946.  A. R. WOOLFOLK  2,394,648
METHOD OF MAKING THREE PHASE TRANSFORMERS
Original Filed Aug. 20, 1943  2 Sheets-Sheet 2

INVENTOR.
Arthur R. Woolfolk

Patented Feb. 12, 1946

2,394,648

UNITED STATES PATENT OFFICE 2,394,648

METHOD OF MAKING THREE-PHASE TRANSFORMERS

Arthur R. Woolfolk, Wauwatosa, Wis., assignor to Line Material Company, South Milwaukee, Wis., a corporation of Delaware Original application August 20, 1943, Serial No. 499,318. Divided and this application February 26, 1945, Serial No. 579,842

3 Claims. (Cl. 29—155.57)

This invention relates to the method of making three phase transformers.

This application is a division of my prior co-pending application Serial No. 499,318 filed August 20, 1943, for Core construction for three phase transformers.

Three phase transformers have heretofore been made of the stacked core construction in which a multitude of pieces of flat core steel were joined together by stacking to form the necessary shape of core for the three groups of conducting winding assemblies of the three phase transformer. This stacking operation entailed a high labor cost due to the long process of interleaving all of the small pieces of steel. Even in the initial stacking operation some mechanical stress was always imparted to the core pieces in the practical manufacture of the transformer and this reduced the efficiency of the transformer. Also in the stacked core construction it is necessary for the magnetic flux to traverse a multitude of air gaps and to travel cross grain at the corners of the core and this entailed a certain amount of loss in the core of the transformer.

This invention is designed to overcome the above noted defects, and objects of this invention are to provide a novel method of making a three phase transformer which has its core structure formed of magnetic ribbon wound into three closed cores each preferably composed of a plurality of sections, in which no unusual care is required in the assembly of the parts of the device, in which no bending, machining or other working of the core structure is required after annealing and which therefore provides a finished core free from stresses, and in which short-circuiting of the laminations is avoided as the oxide film formed on the laminations is preserved and is not scraped off as there is no working subsequent to annealing.

Further objects are to provide a method of making a three phase transformer which has three identical cores each having a pair of straight leg portions with each of the three conducting winding assemblies including the primaries and secondaries surrounding a straight leg portion of two of the cores, with the cores extending from the window of one conducting winding assembly directly through the window of the next conducting winding assembly, and with the cores free from transverse cuts or gaps thereby providing a three phase transformer which requires a low exciting current for the transformer, and thus allows a more economical design of the three phase transformer by increasing the flux density and yet not exceeding the allowable limits of exciting current, and in which the path of the magnetic flux follows the grain in the magnetic ribbon due to rolling, thus furthering economy by reducing core losses and exciting current and allowing the material to be worked economically.

Further objects are to provide a method of making a three phase transformer having three cores each of which is formed of a plurality of closed wound sections with two cores interlinking with a conducting winding assembly and with the straight leg portions of adjacent cores arranged back to back and jointly forming a cruciform cross-sectional shape to substantially fill the window of the conducting winding assembly, thus providing a good space factor and allowing the winding of the conducting winding assemblies as circular coils with all of the inherent advantages resulting therefrom such as the ability of the conducting winding to resist distorting forces due to short-circuit or similar conditions as the circular coil is considerably stronger than rectangular coils, and in addition to the mechanical strength entails less danger of damaging the insulation during winding than where a rectangular conducting winding assembly is employed as it requires less tension on the wire and no pounding of the coil to make a firm coil.

Further objects are to provide a method of making a three phase transformer in which the axes of three circular conducting winding assemblies are arranged in parallelism and are located at the apexes of an equilateral triangle and in which the closed wound cores are also symmetrically arranged thus providing a three phase transformer which is symmetrical throughout and which is, therefore, adapted to be mounted in a circular can.

Further objects are to provide a novel method of making a three phase transformer which method contemplates the winding of three closed cores from magnetic ribbon either on a rectangular mandrel or on a circular mandrel in which latter case the cores would be subsequently given a rectangular shape, in either case providing three cores each having two straight leg portions preferably of half cruciform cross-section; the bending of the end portions of the cores edgewise; the subsequent annealing of the cores while they are held clamped in shape; and the final winding of three circular conducting winding assemblies each surrounding a straight leg portion of two cores and being wound in place.

Embodiments of three phase transformers and steps in the method of producing the same are shown in the accompanying drawings, in which.

Figure 1:
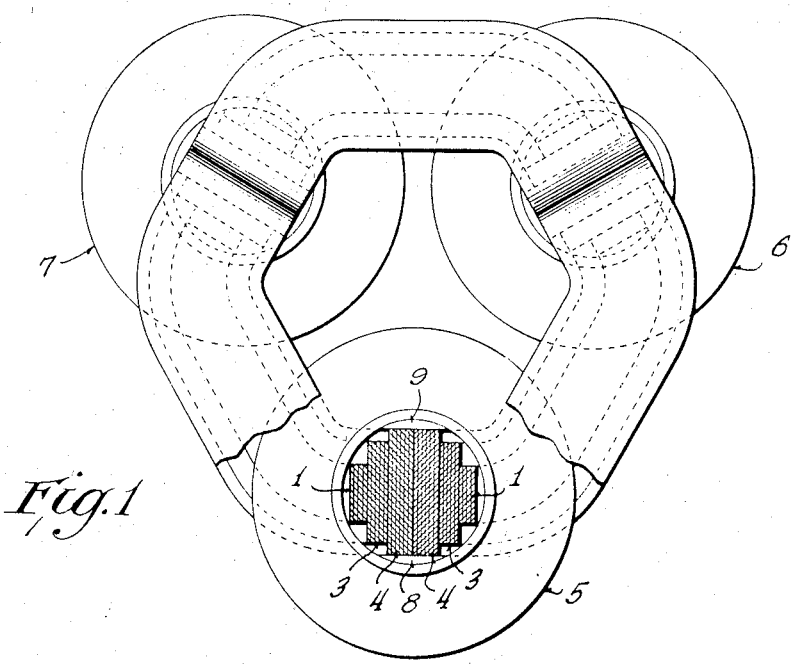
Figure 1 is a plan view of one form of transformer, such view being partly broken away and partly in section.

Referring to Figures 1 to 4, it will be seen that the method followed in making the transformer is to first wind a rectangular core section indicated by the reference character 1 of magnetic ribbon of the narrowest size. The end of the ribbon is spot welded or brazed as indicated at 2 in Figure 3. Thereafter a second and wider core section indicated by the reference character 3 is wound outside of the core section 1 and its end tack welded or brazed. An outer section 4 of still greater width is wound on the section 3 and its end tack welded or brazed. Obviously though three sections have been chosen for illustration, as many sections as desired may be formed in the manner indicated.

These sections are wound, as stated, from magnetic ribbon. Any suitable material may be employed. The core sections may be wound either on a round mandrel and thereafter shaped to the rectangular shape of Figure 3, or may be wound on a rectangular mandrel. After the core sections have been formed as hereinabove described, they are clamped rigidly about their straight leg portions and the end portions are bent edgewise of the ribbon into the shape indicated by dot and dash lines in Figure 4.

Figure 2:
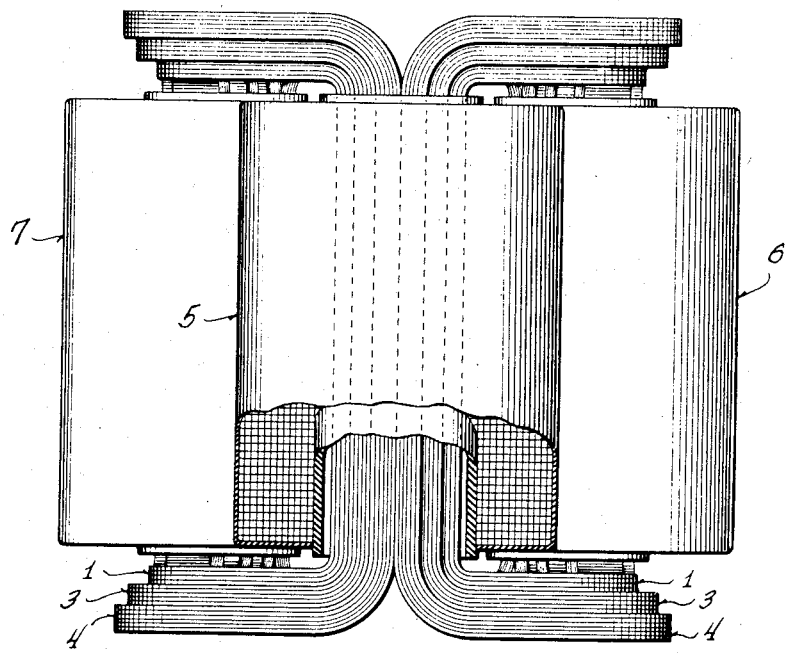
Figure 2 is an elevation of the transformer shown in Figure 1, with parts broken away and in section.
Figure 4:
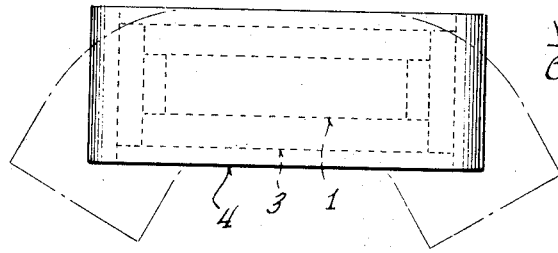
Figure 4 is a plan view of the structure shown in Figure 3, showing in dot and dash lines the manner in which the core section is bent.

Thereafter the core sections are clamped so that they will not change their shape and are annealed. After annealing the core retains its shape and is not worked in any manner. It is neither machined nor bent nor otherwise worked and is therefore free from stresses. Three core sections are arranged as shown in Figures 1 and 2 with the straight leg portions arranged back to back to produce three straight cores of cruciform cross-section. Thereafter the conducting winding assemblies indicated at 5, 6 and 7 are wound on the straight leg portions, each conducting winding assembly surrounding the adjacent leg portions of two core sections. It is intended that the expression "conducting winding assemblies" be understood to include both the primaries and the secondaries.

The conducting winding assemblies may be wound in any suitable manner directly on the cores. They may be wound, for example, on the winding machine disclosed in the patent to Steinmayer et al. No. 2,305,999 of December 22, 1942, for Method and machine for winding coils.

Upon reference to Figures 1 and 2 it will be seen that the cores are so formed that leg portions of two adjacent cores form a cruciform core section passing through the window of the conducting winding assembly and thus give a good space factor. It is to be noted also that by bending the end portion of each core section edgewise of the magnetic ribbon, it is possible to arrange the straight leg portions back to back for adjacent cores and to thus arrange the conducting winding assemblies with their axes parallel and located at the apexes of an equilateral triangle while still having each closed wound core extend directly from the window of one conducting winding assembly to the window of an adjacent conducting winding assembly without any transverse cuts or breaks in the core.

Suitable wedging blocks as indicated at 8 and 9 are driven into place to hold the winding assemblies against shifting with reference to the core sections. Any other suitable means could be employed as desired.

Figure 5:
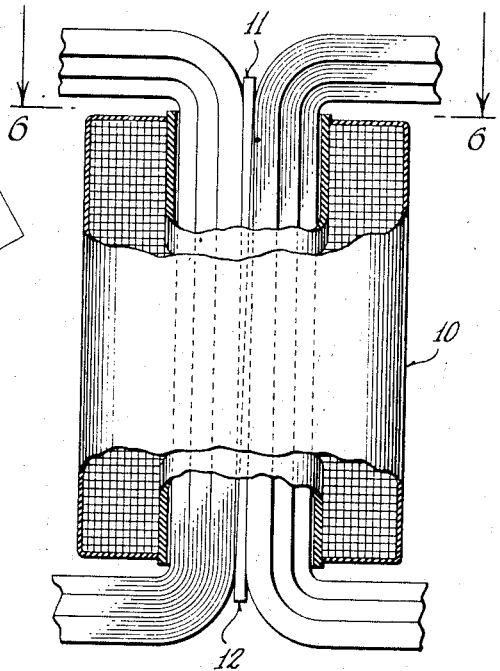
Figure 5 is a view showing a portion of a further form of transformer, such view being partly broken away and in section.
Figure 3:
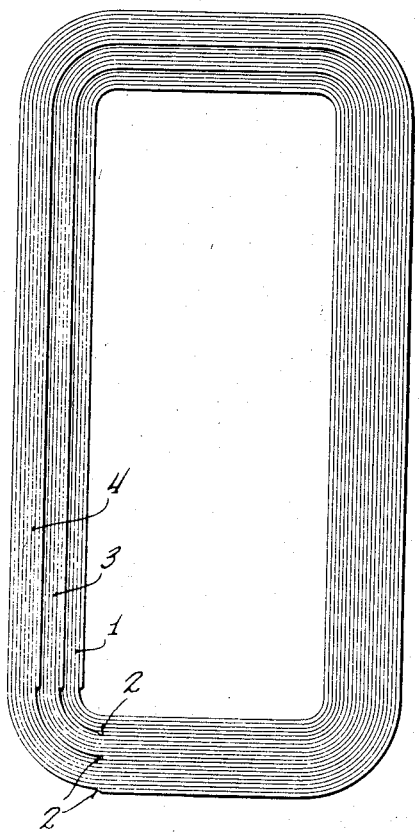
Figure 3 is a view of one of the core sections in an intermediate stage of manufacture.
Figure 6:
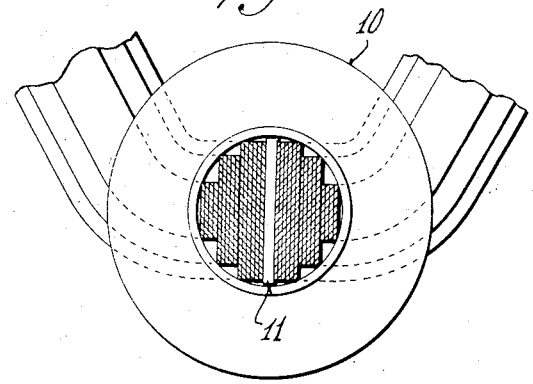
Figure 6 is a sectional view on the line 6—6 of Figure 5.

In the form of the invention shown in Figures 5 and 6 the same method is followed in making the transformer. One winding assembly and portions of adjacent core sections are shown in Figures 5 and 6. The entire transformer is arranged as shown in Figure 1. After the winding assemblies indicated by the reference character 10 in Figures 5 and 6 have been wound around the straight leg portions of the adjacent core sections, wedging members or wedging strips formed of insulating material, indicated at 11 and 12, are driven in between the straight leg portions of adjacent core sections as shown most clearly in Figure 5. It is preferable to have these wedges rather long and to have the tapered portions at least partially overlap so that as the blocks are driven inwardly, they will force the core sections apart a slight amount and make them bind within the inner shell of the winding assembly to hold the winding assemblies against shifting with reference to the cores. The invention disclosed in Figures 5 and 6 is identically like that disclosed in Figures 1 and 2 except for the manner in which the conducting winding assemblies are held against shifting.

It will be seen that a novel three phase transformer and a novel method of producing such transformer as well as a novel form of core construction for a three phase transformer has been provided by this invention. The three phase transformer forms the subject matter of my above identified copending application of which this is a division.

It will be seen further that in following this method the core sections are not cut apart with consequent resulting gaps as has heretofore been done in certain types of three phase transformers. In addition to this, round wound or circular conducting winding assemblies are employed with all their inherent advantages, such as increased mechanical strength for resisting stresses resulting from short-circuit conditions, as the circular coil is preeminently mechanically the strongest type of coil. In addition, there is substantial freedom from danger of cracking or damaging the insulation during the winding of the coil as the wire does not have to be as tightly tensioned as would be the case in rectangular coils and as no pounding is required to get a firm conducting winding assembly.

It is to be noted that the resulting transformer is symmetrical and it is therefore possible to mount the transformer in a round tank.

In addition to this, the process of making the transformer may be very rapidly followed and requires a very small number of operations to produce the finished transformer.

Each winding assembly surrounds or interlinks two adjacent cores and the magnetic flux does not at any time have to pass from one core to another core.

The magnetic ribbon has a grain due to rolling which extends lengthwise of the ribbon and is most permeable to magnetic flux along the grain, that is, lengthwise of the ribbon. This method of making three phase transformers utilizes this most permeable path in the finished transformer as the magnetic flux is lengthwise of the ribbons in all the core sections.

Also it will be seen that with a transformer constructed by this method a very small exciting current is required as the magnetic ribbon forming the core sections is continuous and is not broken by cross cuts with the resulting air gaps but instead is, as stated, formed of continuous closed wound magnetic ribbon.

Although this invention has been described in considerable detail, it is to be understood that such description is intended as illustrative rather than limiting, as the invention may be variously embodied and is to be interpreted as claimed.

I claim:

1. The method of making a three phase transformer comprising winding three closed cores of magnetic ribbon flatwise with each having two straight leg portions joined by end portions, subsequently, bending the end portions edgewise of the magnetic ribbon, annealing the cores, assembling the cores with the leg portions of adjacent cores arranged back to back, and winding three conducting winding assemblies around the straight leg portions of the cores with each winding assembly surrounding a leg portion of each of two adjacent cores, and with the axes of the conducting winding assemblies parallel and positioned at the apexes of an equilateral triangle.

2. The method of making a three phase transformer comprising winding three closed cores of magnetic ribbon wound flatwise with each core formed of a plurality of sections, each section being of a different width from the preceding section and each section having two straight leg portions joined by end portions, subsequently bending the end portions edgewise of the magnetic ribbon, annealing the cores, assembling the cores with the leg portions of adjacent cores arranged back to back so that the leg portions of adjacent cores will form a core having a cruciform cross-section, and winding three circular conducting winding assemblies around the straight leg portions of the cores with each conducting winding assembly surrounding a leg portion of each of two adjacent cores.

3. The method of making a three phase transformer comprising forming three closed cores of wound magnetic ribbon, each core having a pair of straight leg portions joined by end portions, clamping the straight leg portions of each core and bending the end portions edgewise laterally outwardly, annealing the cores while they are clamped, assembling the cores with the straight leg portions of adjacent cores arranged in close proximity to each other and in parallelism, and winding three conducting winding assemblies around the straight leg portions of the cores with each winding assembly surrounding a straight leg portion of each of two adjacent cores.

ARTHUR R. WOOLFOLK.